United States Patent Office 2,772,987
Patented Dec. 4, 1956

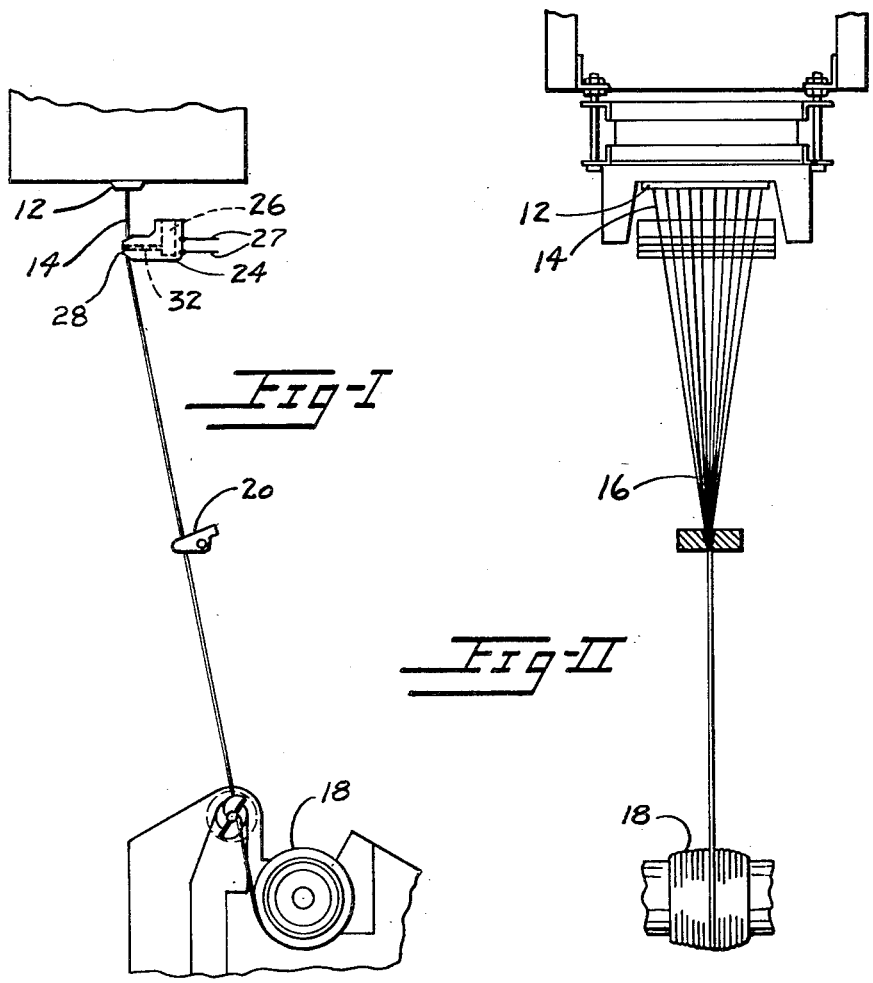

2,772,987

GLASS COMPOSITION AND METAL COATED GLASS FIBER

Harry B. Whitehurst, Granville, and William H. Otto, Newark, Ohio, assignors to Owens-Corning Fiberglas Corporation, a corporation of Delaware Application November 7, 1952, Serial No. 319,388

5 Claims. (Cl. 117—126)

This invention relates to a glass composition and particularly to one adapted for being formed into fibrous material. The invention relates more specifically to metal coated fibrous glass materials.

In the past fibrous glass has been used in the form of a multiplicity of products and furthermore has been used in combination with other materials in many additional products. Fibrous glass has been treated with various sizes, finishes and other like treatments to enhance its physical properties when used either as a finished product or as one component of a finished product such as a reinforcing material or coating material in a finished product.

These treatments for fibrous glass have been used to improve abrasion resistance, tensile strength, lubricity, hand, outward appearance, and adaptibility for combination or adhesion to materials other than fibrous glass. The size materials have included compositions including starch, gelatine, latices and the like; however, these materials and combinations of these materials have not provided the ultimate properties desired in certain applications of fibrous glass.

For instance, it has been found that when glass fibers, cords, strands or fabrics are used to reinforce a flexible material such as a plasticized resinous material or rubbery material in a finished product, the individual fibers of glass in the reinforcing material abrade upon one another when the product is flexed causing failure within the reinforcing fibers and subsequent failure of the product.

Attempts have been made to provide glass fibers with a metal coating which completely surrounds each individual fiber and thereby protects it from adjacent fibers in a strand. The purpose is to increase the abrasion resistance of the fibers to such a point that strands, yarns, and fabrics made from such fibers will show greatly increased resistance to abrasion, flexing, knotting, and other working which in the case of previously produced glass fiber textiles often was destructive. In the work related to applying coats of metal to fibrous glass it has been found that not all glass compositions are equally well adapted for applying metal coatings thereto.

It is an object of this invention to provide glass compositions having a particular affinity for metal coatings.

It is an object to provide a metal coated glass composition having great abrasion resistance and flex resistance.

It is an object to provide fibrous glass coated with various metals or alloys of these metals.

Other objects are apparent from the description of the invention which is illustrative but is not intended to limit the claims.

The objects are attained by the use of metallic oxide containing siliceous compositions. It has been discovered that glass compositions containing proportions of one or more suitable metal oxides which are in addition to those oxides including silica, alumina and soda normally present in conventional glass compositions are particularly suited for being coated with metals or alloys thereof. These glass compositions are formed into fibers and are then coated with metal or metal alloy using the apparatus shown in the drawings, wherein:

Figure 1 is a schematic side elevational view of apparatus for producing glass fiber strands;

Figure 2 is a front elevational view of the same apparatus;

Figure 3 is a front elevational view of a part of the present invention.

In carrying out this invention a glass composition, such as those disclosed in the examples which follow, is melted and formed into fibers and then coated with a metal as indicated by using the apparatus shown in Figures 1, 2 and 3.

Metal as hereafter referred to shall include metals and alloys of one or more metals as will be disclosed hereafter.

Referring to the drawings, Figure 1 depicts in schematic fashion a fiber producing apparatus, which includes a receptacle and feeder 10 for molten glass that may be heated in any conventional manner. The feeder 10 is provided with a series of outlets 12 in its bottom, from which flow a plurality of streams 14 of molten glass. Preferably, the outlets are all arranged in one or two rows so that the streams as they flow from the outlets are all substantially in the same plane. As the streams flow from the outlets 12 they are drawn out into fibers 16 by means of a rotating drum 18 which winds the fibers thereon, and through the winding action exerts a pulling force on the fibers to draw out the streams. Intermediate the source of the streams of molten glass and the winding drum 18 a guide shoe 20 is provided with a groove to collect the fibers into a group or strand 22, in which relation the fibers are wound on the drum 18. Various coating and sizing materials may be applied to the fibers as they are being grouped into the strand, for example, a binding material such as starch or synthetic resin may be run onto the shoe to coat the fibers and the strand and secure the fibers together in the strand.

The apparatus discussed so far is fairly conventional and common to most manufacturing processes for making continuous filament glass fiber textile strands.

The means for applying molten metal to the fibers as they are being formed includes an applicator 24 which, as shown in Figures 2 and 3, is an elongated metallic receptacle of substantially L shape having a narrow trough 26 extending substantially the full length thereof and enclosed within the vertical extending part of the L-shaped container. The horizontally extending part of the L-shaped container ends in a face 28 which has a plurality of slots 29 therein and through which the fibers 14 pass as they are attenuated on their way to being grouped into a strand. Each one of the slots 29 is connected by means of a small passage 32 with the trough 26 so that molten metal in the trough 26 feeds through the passages to the slots 29. By proper regulation of the level of the molten metal in the trough 26, which can be accomplished by control of the rate of feed of the metal into the trough, just sufficient head is maintained on the metal in the passage 32 to force it as a small drop into the slot 29 where, due to its surface tension, it seeks to remain and resist displacement by the glass fiber 14 being drawn through the slot. The maintenance of the proper head is not critical, however, for it has been discovered that the head may vary considerably without deleteriously effecting the drop of metal within the slot. The glass fiber passing through the slot becomes completely encased in the metal in the slot so that it is coated with a layer of metal which completely surrounds the fiber and extends substantially continuously and uninterruptedly over the fiber surface.

The metal in the applicator is maintained in molten state by heating the applicator by suitable means. For instance, the body of the applicator may be wound with an electric resistance element which in turn is covered with a layer of insulation such as silimanite. The resistance element is connected across terminals 27 to which electrical connection is made.

Glass compositions which are especially adapted for being coated with metals are as follows, proportions being expressed in weight percent:

*Example 1*

| | Percent |
|---|---|
| $SiO_2$ | 45.0–65.0 |
| $Al_2O_3$ | 4.0–17.0 |
| $B_2O_3$ | 2.0–13.0 |
| $CaO$ | 3.0–18.0 |
| $Na_2O$ | 0.2–15.0 |
| Metallic oxide | 4.0–15.0 |

The metallic oxide may be the oxide of any metal not already included in the above composition and including the oxides of such metals as copper, zinc, lead, tin, aluminum, silver, titanium, and the like. The metallic oxide component used depends upon the metal which is to be applied as a coating to the glass composition. The addition of certain metallic oxides to the glass composition to be coated tends to improve adhesion of the glass composition to some metals. The proper metallic oxide may be added to achieve adherence of a group of metals to any one glass composition for it has been discovered that the addition of a single metal oxide to the glass composition may make the adhesion of a number of metals to the glass possible.

The particular phenomena resulting in good adhesion when certain metallic oxide containing glasses are matched with one or more of a number of metals is not understood; however, examples of some of the glass compositions for promoting metal adhesion are as follows:

One embodiment of the invention is a composition of matter comprising basically the following ingredients in substantially the amounts indicated in weight percent and including a proportion of copper oxide:

*Example 2*

| | Percent |
|---|---|
| $SiO_2$ | 53.0–59.0 |
| $Al_2O_3$ | 5.0–16.0 |
| $CaO$ | 5.0–12.0 |
| $B_2O_3$ | 3.5–10.5 |
| $Na_2O$ | 0.2–3.0 |
| $CuO$ | 5.0–12.0 |

A glass composition having the following ingredients in the weight percentages indicated is prepared in the conventional manner.

*Example 3*

| | Percent |
|---|---|
| $SiO_2$ | 56.9 |
| $Al_2O_3$ | 5.4 |
| $MgO$ | 2.5 |
| $CaO$ | 6.1 |
| $B_2O_3$ | 6.4 |
| $Na_2O$ | 0.5 |
| $K_2O$ | 0.3 |
| $SrO$ | 11.2 |
| $CuO$ | 9.0 |
| $Li_2O$ | 1.7 |

This glass which has 9.0% copper oxide has marked abrasion resistance and flex resistance and at the same time is a siliceous composition that is readily adaptable for being covered with metal coatings including those of zinc, tin, copper, aluminum, woods alloy, roses alloy, alloys of zinc and titanium, tin, silver, and the like. Furthermore, this glass is readily adaptable to be formed into individual fibers which can then be further processed into strands, cords or fabrics as may be desired. The strand, fibers or the like are easily coated with the above metals using the apparatus shown in the drawings or vacuum apparatus conventionally used for applying metals.

Another example of a copper bearing glass is prepared using the following recipe:

*Example 4*

| | Percent |
|---|---|
| $SiO_2$ | 55.7 |
| $Al_2O_3$ | 5.6 |
| $MgO$ | 2.6 |
| $CaO$ | 6.0 |
| $B_2O_3$ | 4.4 |
| $Na_2O$ | 2.5 |
| $K_2O$ | 0.2 |
| $SrO$ | 11.4 |
| $CuO$ | 9.7 |
| $Li_2O$ | 1.9 |

This glass composition is prepared in the conventional manner and is then formed into fibers which are coated with an alloy of copper using the processes disclosed in this invention.

Another copper oxide glass composition is as follows:

*Example 5*

| | Percent |
|---|---|
| $SiO_2$ | 55.7 |
| $Al_2O_3$ | 14.5 |
| $CaO$ | 10.0 |
| $B_2O_3$ | 9.0 |
| $Na_2O$ | 0.6 |
| $CuO$ | 10.2 |

This glass is satisfactorily coated with 99:1 zinc-titanium alloy.

The above copper oxide containing glass compositions have been found very suitable for coating with metals. It is found that a metal oxide such as copper oxide in the recipe provides two great advantages:

(1) The glass compositions have high abrasion resistance themselves.

(2) The glass composition is particularly suited for being coated with metallic or metal oxide layers.

In another embodiment of the invention a zinc oxide containing glass is prepared according to the following recipe:

*Example 6*

| | Percent |
|---|---|
| $SiO_2$ | 47.5 |
| $Al_2O_3$ | 13.5 |
| $B_2O_3$ | 11.5 |
| $CaO$ | 17.5 |
| $ZnO$ | 5.0 |
| $Na_2O$ | 2.9 |
| $F$ | 2.1 |

This glass composition containing 5% of zinc oxide is particularly suited for manufacturing products which are to be coated with metal.

An example of a glass composition which is capable of being formed into fibers that are adapted for being coated with a metal such as zinc or the like is as follows:

*Example 7*

| | Percent |
|---|---|
| $SiO_2$ | 57.0 |
| $Al_2O_3$ | 4.9 |
| $B_2O_3$ | 7.5 |
| $Na_2O$ | 14.5 |
| $TiO_2$ | 7.5 |
| $ZrO_2$ | 3.9 |
| $F$ | 4.7 |

This glass containing 7.5% titanium dioxide is well suited for coating with a metal.

By adding metallic oxides such as those of zinc, copper, lead, titanium, zirconium and the like to glass compositions, it is possible to obtain good adherence of metal coatings thereto. Furthermore, smooth and uniform coatings of metal are achieved by using the glass compositions of this invention. The metals are applied with much greater ease than they are to a glass composition containing no copper, zinc, titanium, zirconium and the like.

The glass compositions of this invention may be coated with metals including lead, zinc, tin, copper, aluminum, silver, woods alloy, roses alloy, and other alloys such as that of zinc-titanium, lead-copper, lead-tin, aluminum-copper, aluminum-gold, aluminum-zinc, aluminum-tin, lead antimony, cadmium-zinc, copper-cadmium, tin-indium, silver-tin, silver-zinc, copper-zinc, aluminum-manganese, antimony-tin, antimony-zinc, copper-aluminum, Dow metal, brazing and soldering alloys, and the like. The alloys may be high in one of two ingredients or may include various proportions of more than two metals as evidenced by the woods alloy.

The melting point of such metals varies from about 65° C. to about 1000° C. or higher.

Although the exact relationship of better adhesion of metals to glass and the addition of such metal oxides as have been disclosed above to the glass composition is not known, it is believed that the addition of the oxide of the coating metal to the glass composition does lend particular affinity of the glass composition to the coating metal. Likewise, the metal oxide added to a siliceous composition lends affinity of that glass composition to other metals besides the particular metal from which the metallic oxide has been formed. For instance, glass compositions containing copper oxide can be coated with other metals than copper as shown in the examples and particularly in Example 3. In addition to this adaptability to be coated with metals, the copper oxide bearing glasses have a slippery surface which provides high abrasion resistance to the glass composition itself. The high abrasion resistance of copper oxide glasses whether coated or not further insures that failure within reinforced products will not occur. The abrasion resistance of the glass is high enough to help prevent failure in instances where the metallic coating is non-uniform as applied or is worn through with use.

While a glass made in accordance with the present invention may be formed, if desired, into the usual pressed, blown, cast, rolled or extruded objects, commonly found in the art, glass fibers produced by the methods of this invention may also be successfully fabricated into strands, twisted yarns, ply yarns, and then interwoven, knitted, or braided into various textiles. Strands produced by attenuating fibers with roll pullers may also be produced according to the methods of this invention.

Various modifications and changes may be made in the present invention within the spirit and scope of the following claims.

We claim:

1. Metal coated fibers of a glass composition comprising by weight:

|  | Percent |
|---|---|
| $SiO_2$ | 56.9 |
| $Al_2O_3$ | 5.4 |
| MgO | 2.5 |
| CaO | 6.1 |
| $B_2O_3$ | 6.4 |
| $Na_2O$ | 0.5 |
| $K_2O$ | 0.2 |
| SrO | 11.3 |
| CuO | 9.0 |
| $Li_2O$ | 1.7 | and only minor proportions of any other oxides as impurities.

2. The article of claim 1 wherein the metal is a 99:1 alloy of zinc and titanium.

3. A glass composition adapted for producing fibers which are to be metal coated comprising by weight:

|  | Percent |
|---|---|
| $SiO_2$ | 56.9 |
| $Al_2O_3$ | 5.4 |
| MgO | 2.5 |
| CaO | 6.1 |
| $B_2O_3$ | 6.4 |
| $Na_2O$ | 0.5 |
| $K_2O$ | 0.2 |
| SrO | 11.3 |
| CuO | 9.0 |
| $Li_2O$ | 1.7 |

4. The article of claim 1 wherein the metal coating comprises zinc.

5. The article of claim 1 wherein the metal coating comprises lead.

References Cited in the file of this patent
UNITED STATES PATENTS

| 2,143,022 | McClure | Jan. 10, 1939 |
| 2,251,913 | Brennan | Aug. 12, 1941 |
| 2,491,761 | Parker et al. | Dec. 20, 1949 |
| 2,500,092 | Parker et al. | Mar. 7, 1950 |
| 2,562,182 | Godley | July 31, 1951 |
| 2,577,936 | Waggoner | Dec. 11, 1951 |
| 2,616,165 | Brennan | Nov. 4, 1952 |
| 2,685,526 | Labino | Aug. 3, 1954 |
| 2,685,527 | Labino | Aug. 3, 1954 |